(No Model.) 4 Sheets—Sheet 1.

D. D. MORGAN.
PLOW OR SCRAPER FOR MAKING ROADS.

No. 366,677. Patented July 19, 1887.

Witnesses.
Chas. R. Burr.
A. J. Stewart.

Inventor.
Dan D. Morgan,
By Church & Church
his Attorneys.

(No Model.) 4 Sheets—Sheet 2.

D. D. MORGAN.
PLOW OR SCRAPER FOR MAKING ROADS.

No. 366,677. Patented July 19, 1887.

Witnesses.
Chas. R. Burt.
A. J. Stewart.

Inventor.
Dan D. Morgan,
by Church & Church
his Attorneys.

(No Model.) 4 Sheets—Sheet 3.

D. D. MORGAN.
PLOW OR SCRAPER FOR MAKING ROADS.

No. 366,677. Patented July 19, 1887.

Witnesses
Chas. R. Bull
A. J. Stuart

Inventor
Dan D. Morgan
By Church & Church
his Attorneys (No Model.) 4 Sheets—Sheet 4.

D. D. MORGAN.
PLOW OR SCRAPER FOR MAKING ROADS.

No. 366,677. Patented July 19, 1887.

Witnesses.
Chas. R. Burt.
A. J. Stewart.

Inventor.
Dan D. Morgan,
By Church & Church,
his Attorneys.

UNITED STATES PATENT OFFICE.

DAN D. MORGAN, OF JOHNSON, VERMONT.

PLOW OR SCRAPER FOR MAKING ROADS.

SPECIFICATION forming part of Letters Patent No. 366,677, dated July 19, 1887.

Application filed July 15, 1886. Serial No. 208,126. (No model.)

*To all whom it may concern:*

Be it known that I, DAN D. MORGAN, of Johnson, in the county of Lamoille and State of Vermont, have invented certain new and useful Improvements in Plows or Scrapers for Making Roads; and I do hereby declare the following to be a full, clear, and exact description of the same, reference being had to the accompanying drawings, forming a part of this specification, and to the figures and letters of reference marked thereon.

My invention has for its object to provide an improved plow or scraper adapted to be used for making or smoothing roads, or more particularly for making and clearing roads through snow; and it consists in a certain novel construction of plow adapted to be drawn by horses or propelled in any suitable manner, whereby the plow may be adjusted to any desired depth and the material thrown to either or both sides of the track, as desired, or the plow may be thrown out of operative position and the whole machine transported from place to place, all as I will now proceed to describe.

Figure 1:
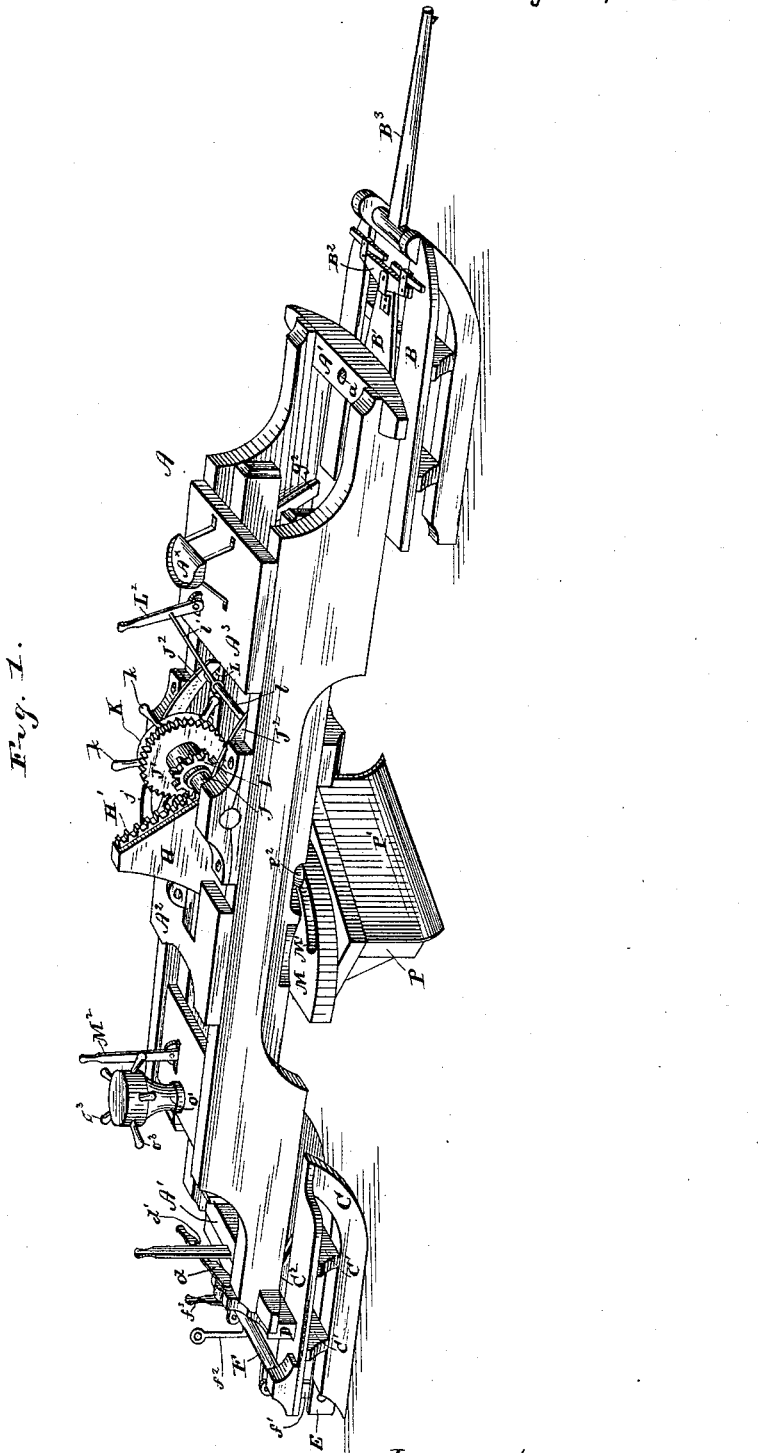
Figure 2:
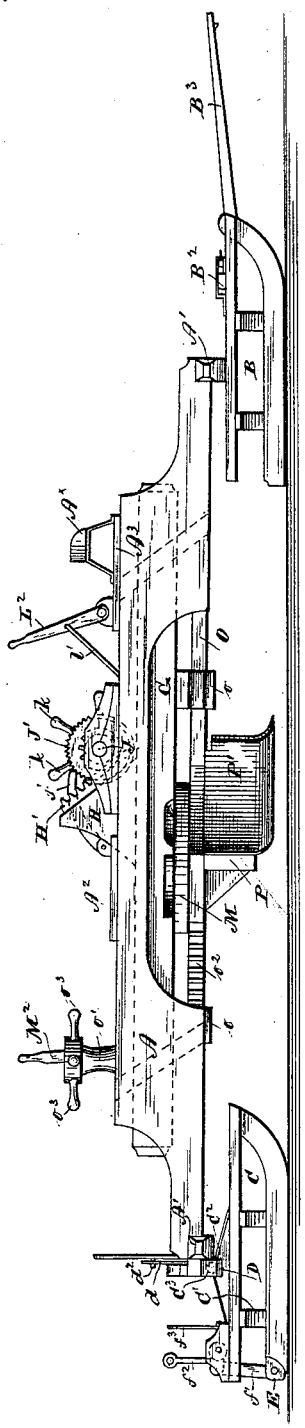
Figure 3:
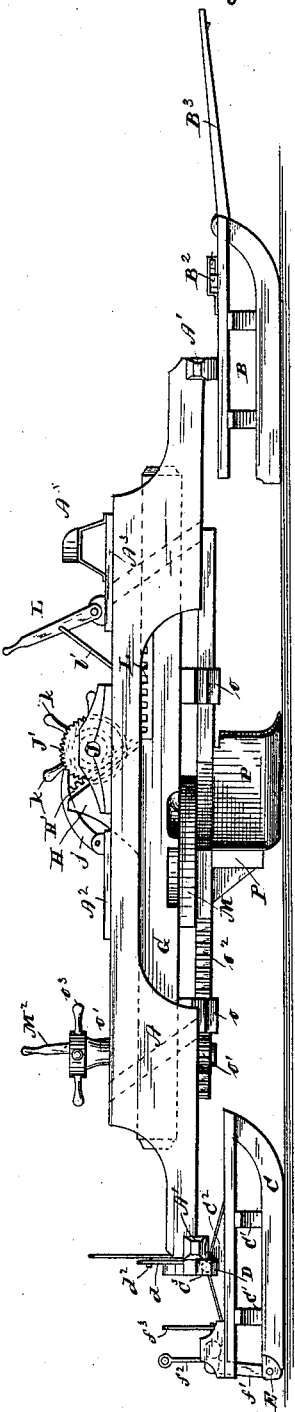
Figure 4:
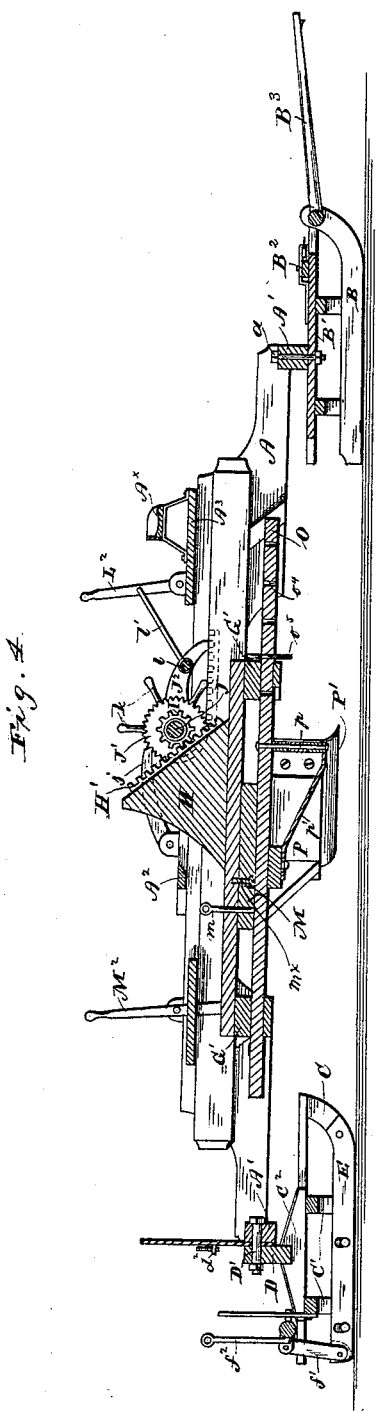
Figure 5:
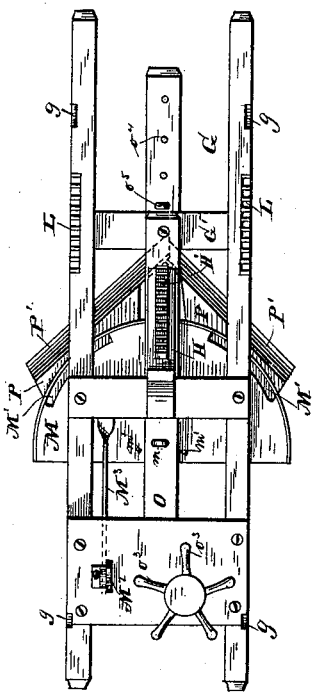
Figure 6:
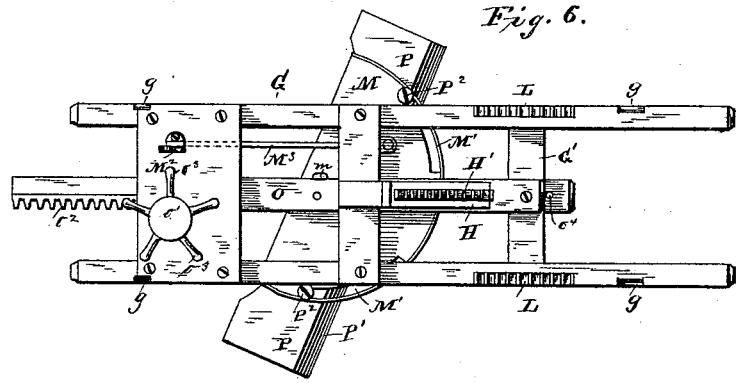
Figure 7:
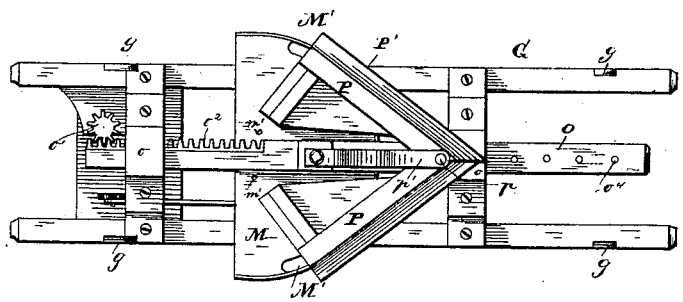
Figure 8:
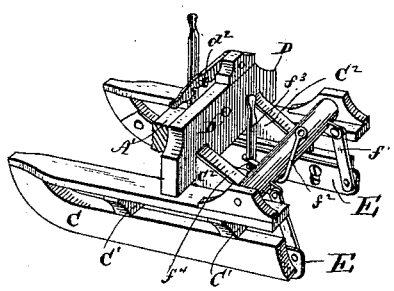

In the drawings, Figure 1 represents a perspective view of my invention; Fig. 2, a side elevation with the plow raised out of operation; Fig. 3, a similar view with the plow in operative position; Fig. 4, a longitudinal sectional view; Fig. 5, a top plan view of the plow-frame removed; Fig. 6, a similar view with the plow arranged to throw to one side; Fig. 7, a bottom plan view of the plow-frame; Fig. 8, a detail view in perspective of the rear supporting-sled of the main frame.

Similar letters of reference in the several figures indicate the same parts.

As shown in the drawings, the device consists, essentially, of a main frame, A, to which the plowing or scraping devices are secured, constructed of the side timbers and the end cross-timbers, A' A', somewhat lower than the top of the frame.

$A^2$ $A^3$ are cross-platforms on the upper side of the frame, upon the forward one of which the driver's seat $A^\times$ is mounted. The main frame is supported at its ends upon any suitable movable supporting devices—such as wheeled trucks or analogous devices; but in the present instance, as the machine is to be used as a snow-plow, these devices consist of sleds B and C, the forward or steering sled, B, being secured to the forward cross-timber by any suitable fifth-wheel connection or by means of a king-bolt, $a$, passing through the timber A' and through a platform, B', secured to the upper side of the sled, as shown. The sled is further provided with a draft-evener, $B^2$, to which the horses are secured, and with a pole, $B^3$, for backing or steering.

The rear supporting sled is adapted to be secured rigidly to the frame A, although capable of some adjustments, to be hereinafter explained. The sled C is constructed similarly to the sled B, except that in lieu of the central platform it is provided with two longitudinal bars, C' C', one at either side, upon which are mounted bearing-blocks $C^2$ $C^2$ for accommodating a shaft, $C^3$, secured to or formed integral with a bar or timber, D, extending transversely across the sled parallel with the timber A', and secured to the latter at the center by means of a rearwardly-projecting bolt or shaft, D', as shown. The timber is free to turn on this bolt, so as to adjust the sled at an angle to the plane of the main frame, and when so adjusted is secured in position by means of a rod or plate, $d$, pivoted to the timber D on one side of the pivot, provided with a series of notches, $d'$, one of which is adapted to be engaged with a co-operating pin or lug, $d^2$, mounted upon a standard on the timber A', as will be readily understood, or any other suitable fastening device may be employed, if desired.

As a means of preventing the rear sled and end of the frame from slipping sidewise, should the road be slippery and icy, I provide steel blades E E, pivoted at their forward ends to the inside of the runners, and the rear ends normally level with the under sides of the runners, but adapted to be projected below, so as to cut into the road or ice by any suitable device for projecting and withdrawing them— as, for instance, such as shown, consisting of the transverse shaft F, secured in suitable bearings on the sled, having arms projecting therefrom, to which are pivoted links $f'$ $f'$, connected to the rear ends of the blades. By rotating this shaft, by means of a suitable handle or lever, $f^2$, the blades can readily be raised or lowered below the lower side of the runner, and secured in said position by any suitable locking mechanism, such as shown, consisting of a standard, $f^3$, pivoted upon the sled-frame and provided with a series of notches, $f^4$, one of which is adapted to engage with an arm or projection on the shaft, as will be seen by reference to Fig. 8.

From the above it will be seen that I have provided a frame, to which a suitable plowing or scraping mechanism is to be applied, supported at the forward end upon a steering-truck and at the rear end upon a truck or sled capable of an independent rocking movement backward and forward on the shaft $C^3$, and also capable of a lateral rocking adjustment, so that the main frame may be prevented from being strained or broken by shocks, and may be kept level when the road-bed is sloping toward one side or the other.

As before stated, the mechanism to be used for scraping or plowing the snow or other material may be of any suitable construction; but I have provided a scraper or plow that is found to answer the purpose admirably, is simple in construction, easily operated, and is particularly adapted to this particular supporting-frame, although it may be applied to any other suitable frame, if desired.

G represents the plow-frame, somewhat shorter than the main frame, constructed of the longitudinal timbers united by the cross-timbers G' and of a width less than that of the frame A, provided on each side with two or more inclined grooves, $g\,g$, in which are inserted corresponding projections or strips, $g^2$, on the inside of the frame A, acting as guides for the frame, when raised and lowered, by suitable mechanism.

Secured to the cross timbers of the frame G is an inclined or wedge-shaped standard, H, and upon its front side is provided an inclined rack, H', placed at the same angle as the grooves in the side timbers of the frame, with which is adapted to co-operate a gear, I, mounted upon a shaft, J, supported in bearings on the side timbers of the frame A. Upon the same shaft, J, is provided a wheel, K, provided with gripping spokes or handles $k$ for rotating the shaft in either direction when desired, thus raising or lowering the plow-frame, while the shaft is prevented from rotation backward, or in a direction to permit the frame to move downward, by a ratchet-wheel, J', with which engages a pawl, $j$, mounted upon the main frame.

L L represent two racks or serrated bars, secured upon the upper side of the frame G, and $J^2\,J^2$ two pawls pivoted upon the shaft J, connected by a cross rod or bar, $l$, projecting downwardly and engaging the racks L L, to prevent the frame being moved upward when in operative position, by reason of the pressure of the plow or scraper against the snow or other material; but the pawls may be raised out of engagement, when desired, by a lever, $L^2$, pivoted upon the main frame and connected to the cross-bar $l$, between the pawls, by means of a link, $l'$, as shown. This lever being located close to the driver's seat, he can, when he perceives an obstruction in the road, raise the pawls out of engagement and permit the plow-frame to slide upward on the guides.

To the under side of the central longitudinal timber of the frame G is pivoted on a pin, $m^x$, a plate, M, having the segmental slots M' M' near its periphery, serving as guides for suitable pins or lugs on the wings or blades of the plow or scraper, and adapted to be oscillated on its pivot by a lever, $M^2$, pivoted on the frame and connected to the plate on one side of its pivot by a link or connecting bar, $M^3$.

O represents a bar or timber supported in suitable guides, $o$, in the under side of the frame, below the plate M, and adapted to be moved back and forth by any suitable mechanism—such, for instance, as the vertical shaft O', secured to the frame—and having on its lower end a gear, $o'$, engaging with a corresponding rack, $o^2$, secured to the bar O, as shown. Upon the upper end of this shaft is a wheel provided with a series of spokes or gripping-handles, $o^3$, so that it may be readily rotated in either direction to move the bar backward or forward.

The plow or scraper, is constructed, preferably, in two sections, P P, pivoted at their inner ends to the bar O by a bolt $p$, (the lower end of the latter being supported by a suitable strap or support, $p'$,) constructed either of metal or of wood suitably braced to stand the strain brought to bear upon them, and are provided with wear-plates P', preferably curved as shown, and with their inner ends overlapping. Their outer ends are supported and guided by headed pins or bolts $P^2\,P^2$, working in the segmental slots M' in the plate M.

It will be noticed that the rear sides of the timbers forming the plow-sections are constructed wider near their outer ends, so that when the forward ends of the sections are moved forward and the rear ends brought in toward the center these wider portions will abut against the longitudinally-movable bar and serve to brace the sections and strengthen them.

From the above it will be seen that the angle at which the sections are to be placed can readily be regulated by rotating the shaft O' and moving the bar O longitudinally, carrying the inner proximate ends of the sections forward or backward, the pins $P^2\,P^2$, working the guide-slots M' of the plate M, serving to bring the rear ends together or to separate them.

In order to operate the plow-sections backward or forward, it is necessary that the rear side of the plate M should be at right angles to the bar O, or that the segmental slots in the said plate be at the same angle on either side of the center line, in order that the outer ends of the plow-sections may describe the same arc when their inner ends are moved forward.

To prevent movement of the bar O backward when the wings of the plow are adjusted to the desired angle, the forward portion of the bar is provided with a series of perforations, $o^4$, through one of which a pin or bar, $o^5$, is inserted, bearing against one of the cross-pieces of the plow-frame, as will readily be understood by reference to Fig 4.

The construction of the device having been described, its operation will now be apparent.

When transporting the machine from place to place, the plow or scraper frame is raised out of operative position, as shown in Fig. 2, by lifting the pawls $J^2$ $J^2$ out of engagement with the racks L L and rotating the shaft J forward by means of the wheel K, which will, by means of the rack on the plow-frame, raise the latter, the guides $g^2$ $g^2$ acting as ways on which it slides. When the frame has been raised as high as necessary, the pawl $j$, dropping behind the last tooth in the ratchet-wheel, will prevent the rotation of the shaft in the opposite direction and the falling of the frame; but when it is desired to lower the plow, the pawl $j$ is disengaged from the ratchet-wheel and the frame allowed to slide down on the guides of its own weight; or, if desired, it may be lowered by rotating the shaft J backward, and when desired to force it below the plane of the sleds or supporting-trucks it may be done by a continued rotation of the shaft backward. When the frame is moving downward, the pawls $J^2$ $J^2$, being stout and heavy, fall by gravity and engage the teeth of the rack one after another, so that when any strain comes on the frame G it will be borne by the pawls and in the direction of their length. The various manipulations of which the plow or scraper is susceptible will be obvious. For instance, if it is desired to use the device as a plow throwing the snow or other material to both sides, the lever $M^2$ is moved to a vertical position, so that the rear side of the plate M will be at right angles to the plane of the machine and the segmental slots be equal on both sides of the center line, and it is then secured in this position by passing the pin $m$ (connected to the frame by a chain) through the perforations in the central timber of the frame and through the central perforation of a series, $m'$, on the plate M, as shown. The shaft O' is now rotated so as to run the bar O forward. The inner ends of the plow sections moving forward, will cause the rear ends to move forward also, the latter being guided by the bolts sliding in the segmental slots M' and moving toward each other, making the angle greater as the movement continues, so that the greatest angle will be reached when the ends of the sections rest against the forward support for the bar O. When in this position, the pin $o^4$ is slipped through a perforation in the bar O just forward of the support, so that any pressure on the sections will not run them backward, but will be borne by the pin. The angle which the sections maintain toward each other can be regulated by adjusting the bar O, and the latter fastened in adjusted position by means of the pin and the perforations on the bar, as described.

When it is desired to use the device to throw the snow or other material to one side—say to the right—the shaft O' is rotated and the bar brought back to normal position, bringing the forward ends of the plow-sections back, the bolts $P^2$ being forced backward to the rear ends of the segmental slots M'. When the forward and rear ends are even, the pin $m$ is removed from the perforations $m'$ and the lever $M^2$ moved backward or forward, so as to rotate the plate M on its pivot and cause the scraper thereon to assume any angle desired. When the proper angle is reached, the pin $m$ is passed through the central timber and through the perforation in the plate M that happens to register, thus securing the scraper in position. It will be of course understood that by removing this pin and operating the lever in the opposite direction the scraper may be reversed and the material thrown to the other side.

The advantages of my invention will now be apparent.

The main frame is entirely independent of the particular plow mechanism and capable of independent adjustment and manipulation, and the plow-frame is entirely independent of the particular supporting-frame, and has all the mechanism for adjusting and manipulating the plow or scraper mounted upon it and not connected with the main frame by chains, levers, &c., that are liable to get out of order, and thus destroy the effectiveness of the machine and render it inoperative when running over rough roads. The only connection between the main and the plow frames, it will be noted, is the rack and gear for raising and the strips and grooves for guiding it in its movements.

I do not desire to be confined to the exact construction of devices shown and described, as there are others the equivalent of those shown which will answer the same purposes, although not in as perfect a manner.

I claim as my invention—

1. The combination, with the main frame having the truck at the forward end for steering, of the transverse timber pivoted at the rear of the frame by a longitudinal horizontal pivot and capable of being adjusted thereon, the standard mounted upon the main frame having the projection, and the plate or bar having the notches for engaging the projection mounted upon the timber, and the truck secured to the timber, substantially as described.

2. The combination, with the main frame mounted upon the two sleds, the forward movable and the latter rigid, of the blades secured to the runners of the rear sled, and means for projecting them below the latter, substantially as described.

3. The combination, with the main frame mounted upon the two sleds, the forward one movable and the latter rigid, of the blades secured to the runners, the shaft connected by links with the blades, and means for rotating said shaft, so as to project and retract the blades, substantially as described.

4. The combination, with the main frame having the inclined guides and the plow-frame working therein and having the rack or racks, of means for raising and lowering said frame, and the pawl or pawls mounted on the main frame for engaging the rack or racks on the frame and preventing the latter from moving upon the guides, substantially as described.

5. The combination, with the main frame having the inclined guides and the plow-frame working thereon and having the rack or racks, of means for raising and lowering the plow-frame, and the pawls on the main frame co operating with the racks on the plow-frame for preventing the upward movement of the latter, substantially as described.

6. The combination, with the main frame on which the driver's seat is mounted having the inclined guides and the plow-frame working thereon and having the rack or racks, of means for raising and lowering said plow-frame, the pawls engaging said racks, and a lever located near the driver's seat for engaging and disengaging said pawls from the racks when desired, substantially as described.

7. The combination, with the main supporting-frame, the plow-frame, the plow constructed of two sections or wings pivoted near the center of the plow-frame, and guides for the rear ends of the plow sections or wings, of means, substantially as described, for moving the inner ends of the plow-wings backward and forward, so as to vary their angle with relation to each other, as set forth.

8. The combination, with the frame, of two wings or sections pivoted together at their ends, guides for their outer ends, and means for moving the pivot of the sections longitudinally, so as to adjust their angle relative to each other, substantially as described.

9. The combination, with the plow-frame, the plow consisting of the wings or sections pivoted near the center of the frame, and means for moving the inner ends of the wings forward, of guides for the rear ends of the frame for causing them to approach when the forward ends are moved forward, substantially as described.

10. The combination of the plow-frame, the plow consisting of two wings or sections pivoted upon the longitudinally-movable bar at their inner ends, and means for causing their outer ends to approach when the bar is moved forward, so as to vary their angle with relation to each other, substantially as described.

11. The combination of the plow-frame, the plow consisting of two wings or sections pivoted upon the longitudinally-movable bar at their inner ends, the pins or bolts at their outer ends, and the segmental slots, substantially as described.

12. The combination of the plow-frame, the plow consisting of the wings or sections pivoted upon the longitudinally-movable bar at their inner ends and having the pins or bolts at their outer ends, and the plate having the segmental slots in which said pins or bolts operate, substantially as described.

13. The combination of the plow-frame, the plow consisting of the wings or sections pivoted upon the longitudinally-movable bar at their inner ends and having at their outer ends pins or bolts working in the segmental slots, the rack on the movable bar and the shaft having the gear thereon co-operating with said rack, and means for rotating said shaft, substantially as described.

14. The combination of the plow-frame, the plate pivoted thereon having the segmental slots, the longitudinal bar and means for moving it longitudinally, the plow-sections having their inner ends pivoted on said bar and their outer ends guided by the segmental slots in the plate, and means for rotating the plate on its pivot, substantially as described.

15. The combination of the plow-frame, the plate pivoted thereon having the segmental slots, the longitudinal bar and means for moving it longitudinally, the plow-sections having their inner ends pivoted on said bar and their outer ends guided by the segmental slots in the plate, and the lever mounted on the frame and connected to one side of the pivot of the segmental plate for vibrating said plate on its pivot.

16. The combination of the plow-frame, the plow consisting of the two wings or sections with the protecting-plates secured thereon, the end of one overlapping that of the other pivoted near the center of the frame, and devices, substantially as described, for changing the angle of the wings with relation to each other, as set forth.

17. The combination of the plow-frame, the plow consisting of the two wings or sections, the longitudinally-movable bar supported in guides on said frame, to which the inner ends of the wings are pivoted, and guides for the outer ends of the wings, so that when the bar is moved forward or backward the angle of the wings will be changed with relation to each other, and means, substantially as described, for securing said longitudinal movable bar in position, as set forth.

18. The combination of the plow-frame, the plow consisting of two wings or sections pivoted at their inner ends and having near their outer ends pins or bolts, the pivoted plate having the segmental slots in which the pins work, means for adjusting the plate on its pivot, and means for locking said plate in adjusted position, substantially as described.

19. The combination of the frame, the plow or scraper composed of two sections pivoted at their inner ends and capable of adjustment, so as to vary the angle relative to each other, the frame pivoted on a vertical axis on which the front sections are supported, and means for moving the said frame on its pivot, substantially as described.

DAN D. MORGAN.

Witnesses:
C. S. KENFIELD,
WM. MCLENATHAN.